US010408336B2

(12) United States Patent
Nadayoshi et al.

(10) Patent No.: US 10,408,336 B2
(45) Date of Patent: Sep. 10, 2019

(54) DIFFERENTIAL APPARATUS

(71) Applicant: AISIN AW CO. LTD., Anjo-shi, Aichi-ken (JP)

(72) Inventors: Kaoru Nadayoshi, Anjo (JP); Nobutada Sugiura, Nishio (JP); Seiya Ozawa, Nishio (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 2 days.

(21) Appl. No.: 15/541,526

(22) PCT Filed: Feb. 18, 2016

(86) PCT No.: PCT/JP2016/054672
§ 371 (c)(1),
(2) Date: Jul. 5, 2017

(87) PCT Pub. No.: WO2016/158059
PCT Pub. Date: Oct. 6, 2016

(65) Prior Publication Data
US 2018/0038475 A1    Feb. 8, 2018

(30) Foreign Application Priority Data

Mar. 27, 2015  (JP) .................................. 2015-066883
Mar. 30, 2015  (JP) .................................. 2015-068183

(51) Int. Cl.
*F16H 48/08*    (2006.01)
*F16H 57/04*    (2010.01)
*F16H 48/40*    (2012.01)

(52) U.S. Cl.
CPC ......... *F16H 57/0483* (2013.01); *F16H 48/08* (2013.01); *F16H 48/40* (2013.01);
(Continued)

(58) Field of Classification Search
CPC ............ F16H 57/0483; F16H 57/0457; F16H 57/043; F16H 57/0427; F16H 48/08; F16H 57/04; F16H 48/40
See application file for complete search history.

(56) References Cited

U.S. PATENT DOCUMENTS

2006/0063633 A1* 3/2006 Turner ................ F16H 57/0447
475/220
2010/0093482 A1* 4/2010 Allmendinger ...... B60K 17/354
475/234
(Continued)

FOREIGN PATENT DOCUMENTS

JP    50-002030 U    1/1975
JP    57-000157 U    1/1982
(Continued)

OTHER PUBLICATIONS

International Search Report of PCT/JP2016/054672, dated May 17, 2016. [PCT/ISA/210].

*Primary Examiner* — David J Hlavka
(74) *Attorney, Agent, or Firm* — Sughrue Mion, PLLC

(57) ABSTRACT

A differential case has no hole other than two oil holes except for a pinion shaft hole and a pair of drive shaft holes and has an annular receiver attached thereto that has an inner periphery smaller than the outer periphery of side gear washers with respect to the rotation center of the rotation axis of drive shafts and that has an outer periphery located beyond the outermost edge of the oil holes with respect to the rotation center of the rotation axis. This controls the outflow of lubricating oil located radially outward of the inner periphery of the receiver, thus allowing the side gear washers to be supplied with lubricating oil, regardless of whether the differential case is rotating or stops rotating.

19 Claims, 8 Drawing Sheets

(52) U.S. Cl.
CPC ............ *F16H 57/04* (2013.01); *F16H 57/043* (2013.01); *F16H 57/0427* (2013.01); *F16H 57/0457* (2013.01)

(56) References Cited

U.S. PATENT DOCUMENTS

2010/0105513 A1* 4/2010 Hilker ................. F16H 57/0483
                                                         475/160
2010/0184552 A1* 7/2010 Soybel .................... F16H 48/08
                                                         475/230
2016/0334005 A1* 11/2016 Adragna ............ F16H 57/0483

FOREIGN PATENT DOCUMENTS

| JP | 2002-174327 A | 6/2002 |
| JP | 2008-138780 A | 6/2008 |

* cited by examiner

DIFFERENTIAL APPARATUS

CROSS REFERENCE TO RELATED APPLICATIONS

This application is a National Stage of International Application No. PCT/JP2016/054672 filed Feb. 18, 2016, claiming priorities based on Japanese Patent Application Nos. 2015-066883, filed Mar. 27, 2015, and 2015-068183, filed Mar. 30, 2015, the contents of all of which are incorporated herein by reference in their entirety.

TECHNICAL FIELD

The present disclosure relates to a differential apparatus.

BACKGROUND ART

In one known differential apparatus of this type, an oil reservoir is provided in a differential case to retain lubricating oil supplied therein when the differential case rotates (for example, refer to Patent Document 1). In this differential apparatus, lubricating oil is supplied into the differential case through a rolling bearing that freely rotatably supports the differential case and through an oil hole that is formed in the differential case at a position radially outward of a side gear, and the oil reservoir is located radially outward of the oil hole. Furthermore, lubricating oil supplied to lubricate a sliding part between a wheel drive shaft and an axle through hole flows into the differential case and is then supplied to lubricate a sliding part between the back surface of the side gear and the inner surface of the differential case and a coupling part, such as splines, between the side gear and the wheel drive shaft.

RELATED ART DOCUMENT

Patent Document

Patent Document 1: Japanese Patent Application Publication No. 2002-174327 (JP 2002-174327 A)

SUMMARY

However, in the above-described differential apparatus, the oil hole is located radially outward of the side gear. Thus, when the differential case stops rotating with the oil hole in the lowest position, the oil reservoir retains lubricating oil, but lubricating oil located above the oil hole flows out from the oil hole. This may cause a shortage of supply of lubricating oil to, for example, a washer that is located radially inward of (above) the oil hole and that is attached between the side gear and the differential case. When the differential case is rotating, lubricating oil located radially inward of the oil hole is centrifugally drained from the oil hole, thus causing a shortage of supply of lubricating oil to the washer located radially inward of the oil hole likewise.

Furthermore, since the amount of lubricating oil supplied to the sliding part between the wheel drive shaft and the axle through hole is very small, the amount of lubricating oil that passes through the sliding part between the wheel drive shaft and the axle through hole and that is then supplied to the sliding part between the back surface of the side gear and the inner surface of the differential case is very small. Therefore, to ensure the durability of a side washer provided between the back surface of the side gear and the differential case, a surface pressure acting on the side washer needs to be reduced. This requires increasing the pressure receiving area of the side washer by increasing the size of the side gear or requires limiting torque when a differential mechanism works, in other words, when the side gear rotates. As a result, the differential apparatus increases in size or the traveling performance is limited.

The main purpose of a differential apparatus according to the present disclosure is to retain lubricating oil in a differential case.

The differential apparatus according to the present disclosure takes the following measures to achieve the above-described main purpose.

The differential apparatus according to the present disclosure includes: a pinion gear supported on a pinion shaft; a pair of side gears meshing with the pinion gear and respectively fixed to a pair of drive shafts; a differential case that accommodates the pinion gear and the pair of side gears and that has a pinion shaft hole through which the pinion shaft is inserted and a pair of drive shaft holes through which the pair of drive shafts are inserted; and side gear washers located between the pair of side gears and the differential case. In the differential apparatus, except for the pinion shaft hole and the pair of the drive shaft holes, the differential case has no hole other than at least one oil hole that is located radially outward of the side gear washers and that is used to supply and drain lubricating oil, and the differential apparatus further includes an oil outflow control member that extends to a portion radially inward of an outer periphery of the side gear washers to retain oil to a portion radially inward of the oil hole in the differential case.

In the differential apparatus according to the present disclosure, the pinion gear and the pair of side gears are accommodated in the differential case, and the side gear washers are located between the side gears and the differential case. Except for the pinion shaft hole through which the pinion shaft is inserted and the pair of drive shaft holes through which the pair of drive shafts are inserted, the differential case has no hole other than at least one oil hole that is located radially outward of the side gear washers and that is used to supply and drain lubricating oil. The differential apparatus further includes the oil outflow control member that extends to the portion radially inward of the outer periphery of the side gear washers to retain oil to the portion radially inward of the oil hole in the differential case. When the differential case stops rotating with the oil hole in the lowest position, oil is retained to the portion radially inward of the oil hole in the differential case by the oil outflow control member that extends to the portion radially inward of the outer periphery of the side gear washers. Thus, the side gear washers can be supplied with lubricating oil. When the differential case is rotating, lubricating oil in the differential case is centrifugally drained from the oil hole, but lubricating oil located radially outward of the inner periphery of the oil outflow control member is retained in the differential case. Thus, the side gear washers can be supplied with lubricating oil. Therefore, regardless of rotation of the differential case, the side gear washers can be supplied with lubricating oil.

DETAILED DESCRIPTION OF THE PREFERRED EMBODIMENTS

Figure 1:
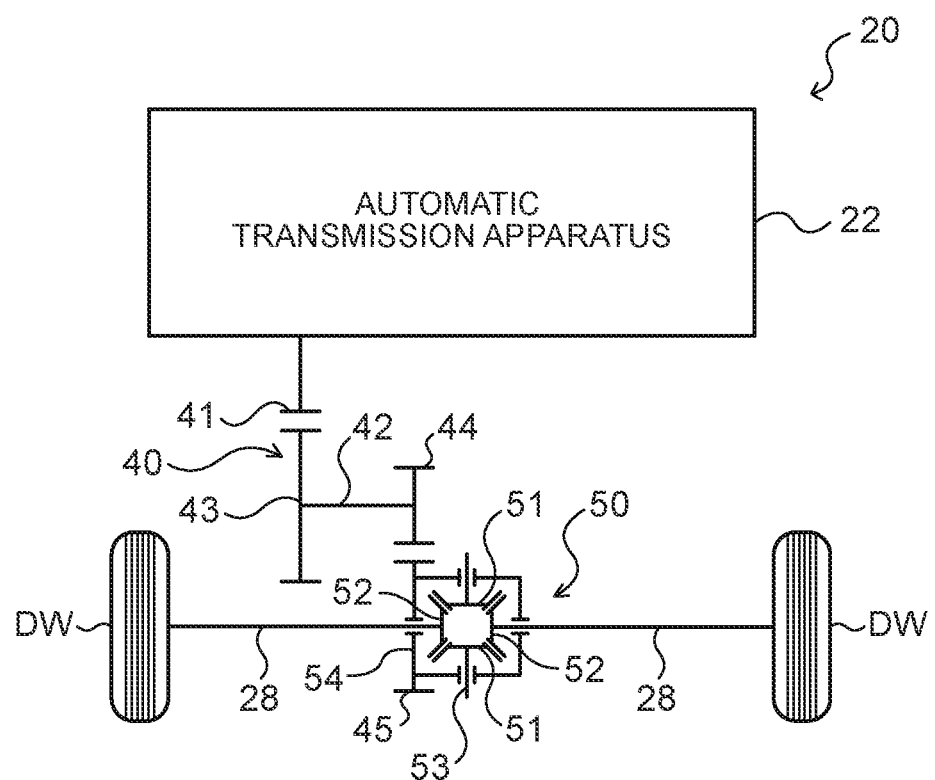
FIG. 1 is a schematic diagram illustrating the structure of a power transmission apparatus 20 including a differential apparatus 50 according to a first embodiment of the present disclosure.

Next, embodiments of the present disclosure are described. FIG. 1 is a schematic diagram illustrating the structure of a power transmission apparatus 20 including a differential apparatus 50 according to a first embodiment of the present disclosure. The power transmission apparatus 20 according to the first embodiment is connected to a crankshaft of an unillustrated engine mounted on a front-wheel-drive vehicle to transmit power of the engine to right and left drive wheels (front wheels) DW. As illustrated in the drawing, the power transmission apparatus 20 includes an automatic transmission apparatus 22 having a known hydraulic power transmission (torque converter) and an automatic transmission, a gear mechanism (gear train) 40, and a differential apparatus (differential mechanism) 50.

The gear mechanism 40 includes: a counter driving gear 41 fixed to an unillustrated output shaft of the automatic transmission apparatus 22; a counter driven gear 43 that is fixed to a counter shaft 42 extending in parallel to the output shaft and that meshes with the counter driving gear 41; a driving pinion gear (final driving gear) 44 formed (or fixed) on the counter shaft 42; and a differential ring gear (final driven gear) 45 that meshes with the driving pinion gear 44 and that is coupled to the differential apparatus 50.

Figure 2:
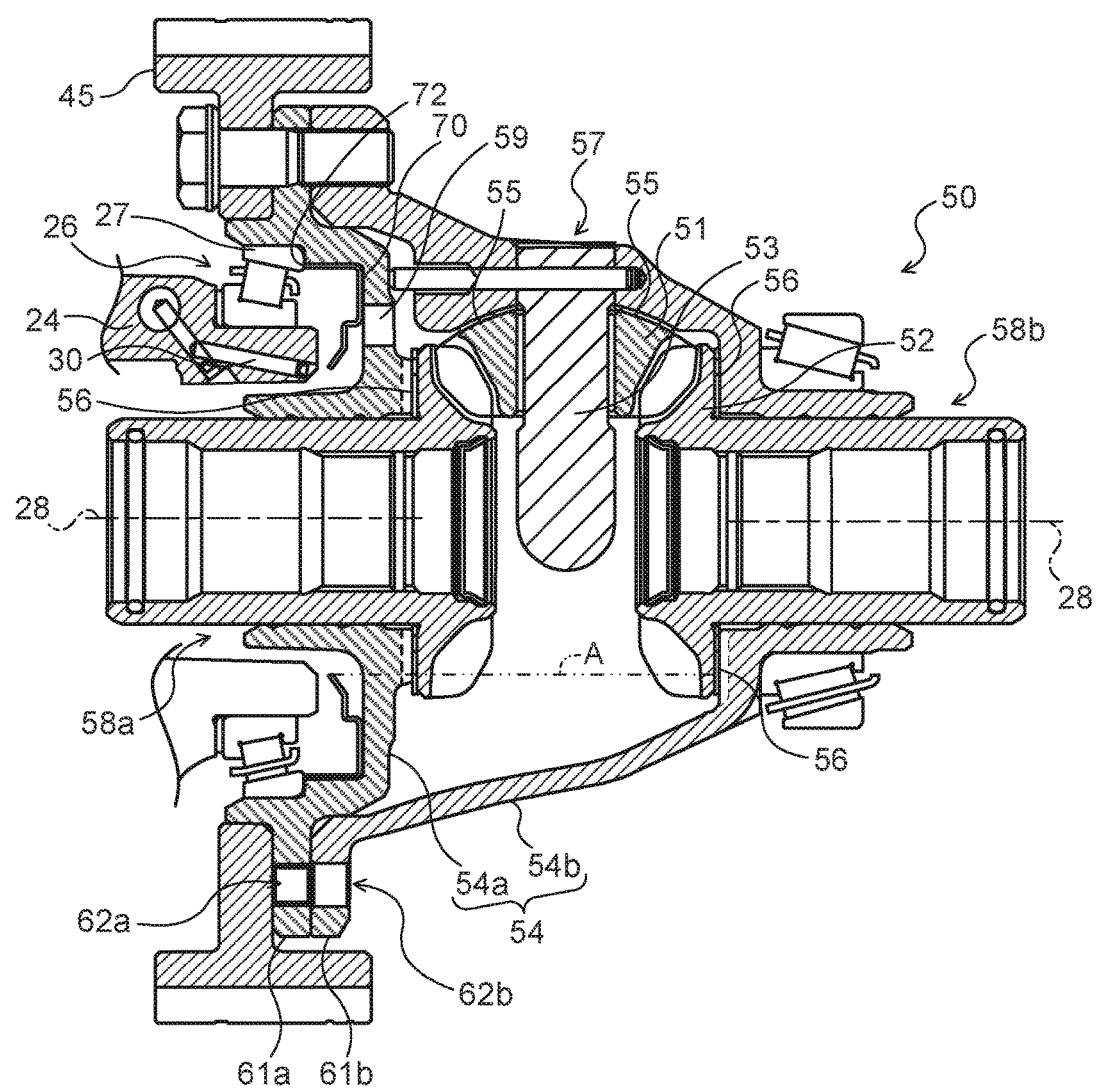
FIG. 2 is a schematic diagram illustrating the structure of the differential apparatus 50.
Figure 3:
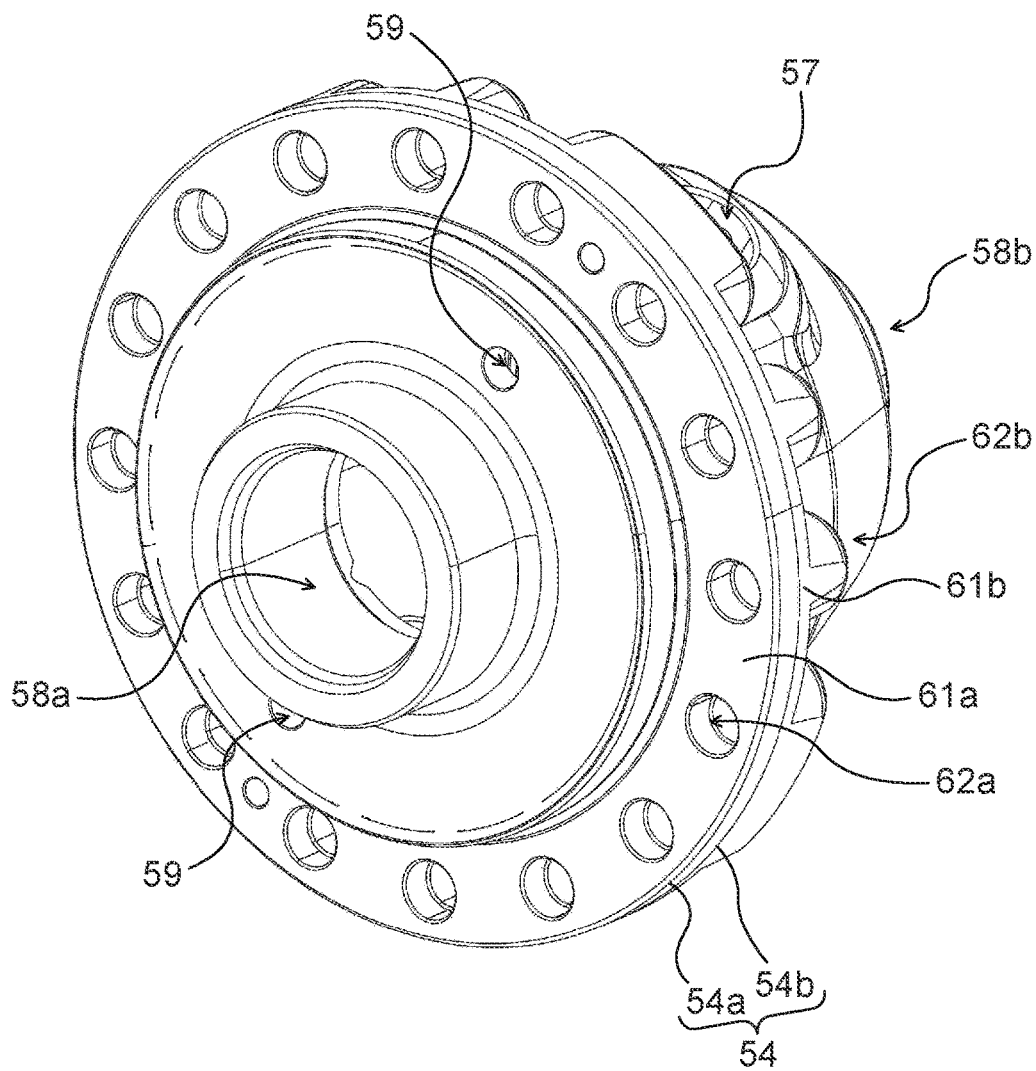
FIG. 3 is a perspective view of a differential case 54 in FIG. 2 diagonally from the top left.
Figure 4:
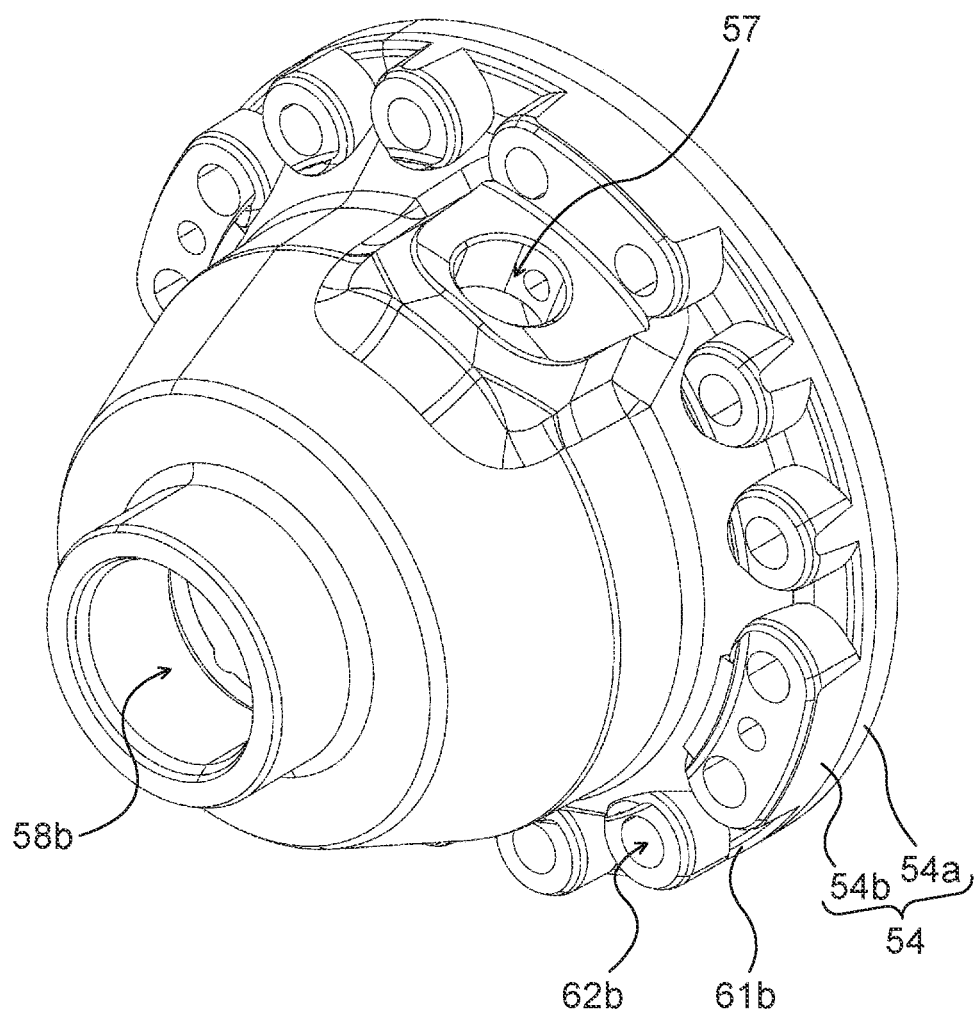
FIG. 4 is a perspective view of the differential case 54 in FIG. 2 diagonally from the top right.

FIG. 2 is a schematic diagram illustrating the structure of the differential apparatus 50. FIG. 3 is a perspective view of a differential case 54 in FIG. 2 diagonally from the top left. FIG. 4 is a perspective view of the differential case 54 in FIG. 2 diagonally from the top right. As illustrated in FIG. 1 and FIG. 2, the differential apparatus 50 includes: a pair of (two) pinion gears 51; a pair of (two) side gears 52 that are fixed to respective drive shafts 28 and that perpendicularly mesh with the pair of pinion gears 51; a pinion shaft 53 that supports the pair of pinion gears 51; and a differential case 54 that accommodates the pair of pinion gears 51 and the pair of side gears 52 and that is coupled (fixed) to the differential ring gear 45. According to the first embodiment, the pinion gears 51 and the side gears 52 are each structured as a straight bevel gear. A pinion gear washer 55 is located between the differential case 54 and each of the pinion gears 51, and a side gear washer 56 is located between the differential case 54 and each of the side gears 52. The differential case 54 is supported through a bearing 26 by a transmission case 24 that is structured with two case members 24a and 24b, so as to freely rotate on the same axis as the drive shafts 28.

The differential case 54 is structured with an annular case member 54a and a bowl-shaped case member 54b. The case member 54a has a drive shaft hole 58a through which the drive shaft 28 illustrated in the left part of FIG. 2 is inserted. The case member 54b has a drive shaft hole 58b through which the drive shaft 28 illustrated in the right part of FIG. 2 is inserted and a pinion shaft hole 57 through which the pinion shaft 53 illustrated in the upper part of FIG. 2 is inserted. Flange portions 61a and 61b provided near the outer edges of the case members 54a and 54b have bolt holes 62a and 62b, and the case members 54a and 54b and the differential ring gear 45 are fastened together by multiple bolts. Except for the pinion shaft hole 57 and the pair of drive shaft holes 58a and 58b, the differential case 54 has no hole other than two oil holes 59. The oil holes 59 are located at an equal radius from the rotation center of the rotation axis of the drive shafts 28 and are used to supply and drain lubricating oil. Lubricating oil is supplied to the two oil holes 59 from a lubricating oil supply pipe 30 formed in the transmission case 24.

An annular receiver 70 with a substantially L-shaped cross-section is attached to the differential case 54 (the case member 54a) and serves as an oil outflow control member that controls the outflow of lubricating oil in the differential case 54. The receiver 70 has an inner periphery smaller than the outer periphery of the side gear washers 56 with respect to the rotation center of the rotation axis of the drive shafts 28 and has an outer periphery located beyond the outermost edge of the oil holes 59 with respect to the rotation center of the rotation axis of the drive shafts 28. The outer periphery portion of the receiver 70 extends to the left in FIG. 2 while bending along the flange portion 61a of the case member 54a, and has an end 72 abutting against a race 27 of the bearing 26. This abutting of the end 72 against the race 27 of the bearing 26 stops the receiver 70 from coming off. The outer periphery side of the receiver 70 is in contact with the case member 54a, and the inner periphery side of the receiver 70 is not in contact with the case member 54a by bending to the left in FIG. 2. Therefore, lubricating oil is supplied into and drained out of the differential case 54 from the inner periphery side that is not in contact with the case member 54a.

Figure 5:
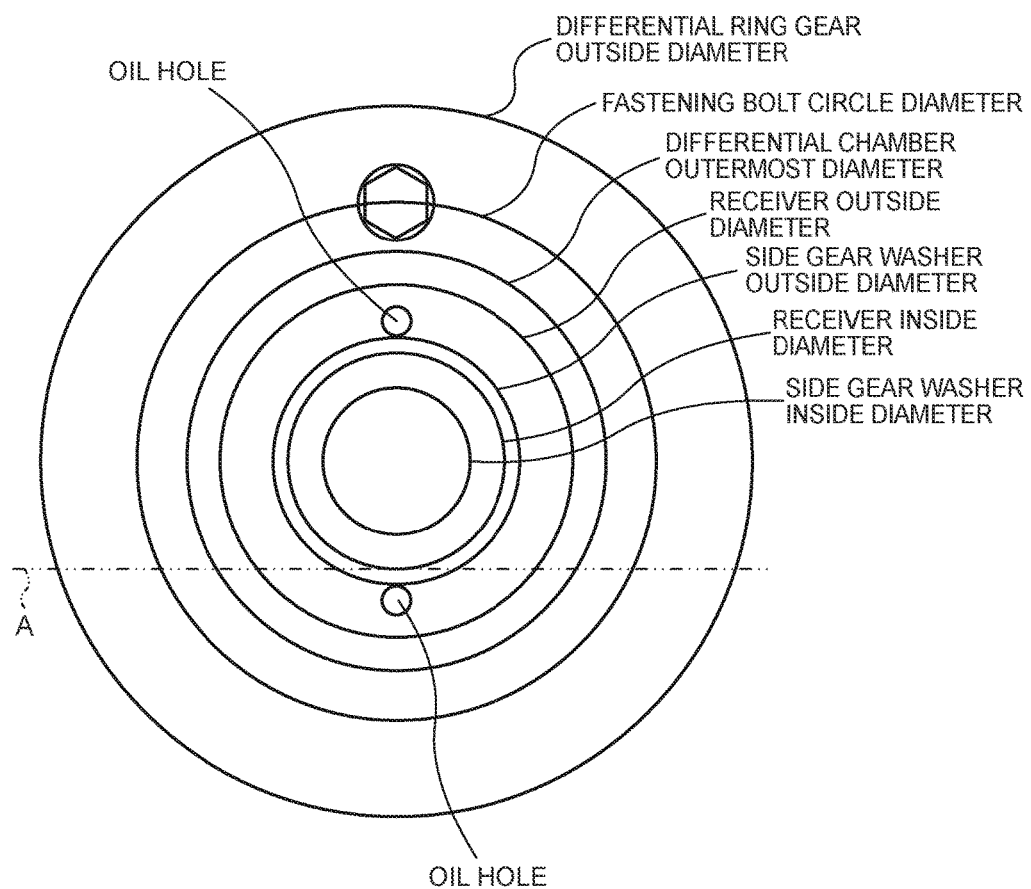
FIG. 5 is an explanatory diagram illustrating the inner periphery and the outer periphery of a receiver 70 and the outer periphery of side gear washers 56.

FIG. 5 illustrates the inner periphery and the outer periphery of the receiver 70 and the outer periphery of the side gear washers 56 when one of the oil holes 59 is in the lowest position. When the differential case 54 stops rotating, the level of lubricating oil in the differential case 54 depends on the positions of the two oil holes 29 and becomes lowest when one of the oil holes 59 is in the lowest position. In this case, as illustrated in FIG. 5, the level of lubricating oil is equal to the lowest part (a long dashed double-short dashed line A in FIG. 2 and FIG. 5) of the inner periphery of the receiver 70. Since the inner periphery of the receiver 70 is smaller than the outer periphery of the side gear washers 56, the outer periphery side of the side gear washers 56 soaks in lubricating oil even when the level of lubricating oil is in the lowest position. When one of the oil holes 59 is not in the lowest position, the level of lubricating oil is in a higher position, so that the outer periphery side of the side gear washers 56 naturally soaks in lubricating oil. Thus, when the differential case 54 stops rotating, the side gear washers 56 can be always supplied with lubricating oil, regardless of the rotation positions of the oil holes 59. In contrast, when the differential case 54 is rotating, lubricating oil is centrifugally drained from the two oil holes 59, but the presence of the receiver 70 controls the outflow of lubricating oil located radially outward of the inner periphery of the receiver 70.

Thus, even when the differential case 54 is rotating, the outer periphery portion of the side gear washers 56 can be supplied with lubricating oil.

In the above-described differential apparatus 50 according to the first embodiment, except for the pinion shaft hole 57 and the pair of drive shaft holes 58a and 58b, the differential case 54 has no hole other than two oil holes 59 and has the annular receiver 70 attached thereto that has the inner periphery smaller than the outer periphery of the side gear washers 56 with respect to the rotation center of the rotation axis of the drive shafts 28 and that has the outer periphery located beyond the outermost edge of the oil holes 59 with respect to the rotation center of the rotation axis of the drive shafts 28. This controls the outflow of lubricating oil located radially outward of the inner periphery of the receiver 70, thus allowing the side gear washers 56 to be supplied with lubricating oil, regardless of whether the differential case 54 is rotating or stops rotating.

In the differential apparatus 50 according to the first embodiment, except for the pinion shaft hole 57 and the pair of the drive shaft holes 58a and 58b, the differential case 54 has no hole other than two oil holes 59 that are located at an equal radius from the rotation center of the rotation axis of the drive shafts 28 and that are used to supply and drain lubricating oil. However, the number of oil holes is not limited to two. The differential case 54 may have one oil hole or three or more oil holes as long as the oil holes are located at an equal radius from the rotation center of the rotation axis of the drive shafts 28.

In the differential apparatus 50 according to the first embodiment, the receiver 70 is shaped such that the outer periphery portion of the receiver 70 bends along the flange portion 61a of the case member 54a and has the end 72 abutting against the race 27 of the bearing 26. Alternatively, the receiver 70 may be shaped such that the end 72 does not abut against the race 27 of the bearing 26. In this alternative, the case member 54a may have a projection or the like that abuts against the end 72 of the receiver 70 to stop the receiver 70 from coming off.

Next, a differential apparatus 50B according to a second embodiment of the present disclosure will be described. Like the differential apparatus 50 according to the first embodiment illustrated in FIG. 1, the differential apparatus 50B according to the second embodiment is incorporated in a power transmission apparatus connected to a crankshaft of an unillustrated engine mounted on a front-wheel-drive vehicle. The differential apparatus 50B according to the second embodiment has the same structure as the above-described differential apparatus 50 according to the first embodiment except that the receiver 70 is replaced with a lubricating oil retaining member 80 and that a differential case 54B has no hole other than an oil hole 59B except for the pinion shaft hole 57 and the pair of drive shaft holes 58a and 58b. Therefore, out of the structure of the differential apparatus 50B according to the second embodiment, the same structure as that of the differential apparatus 50 according to the first embodiment is represented by the same reference character and is not described in detail.

Figure 6:
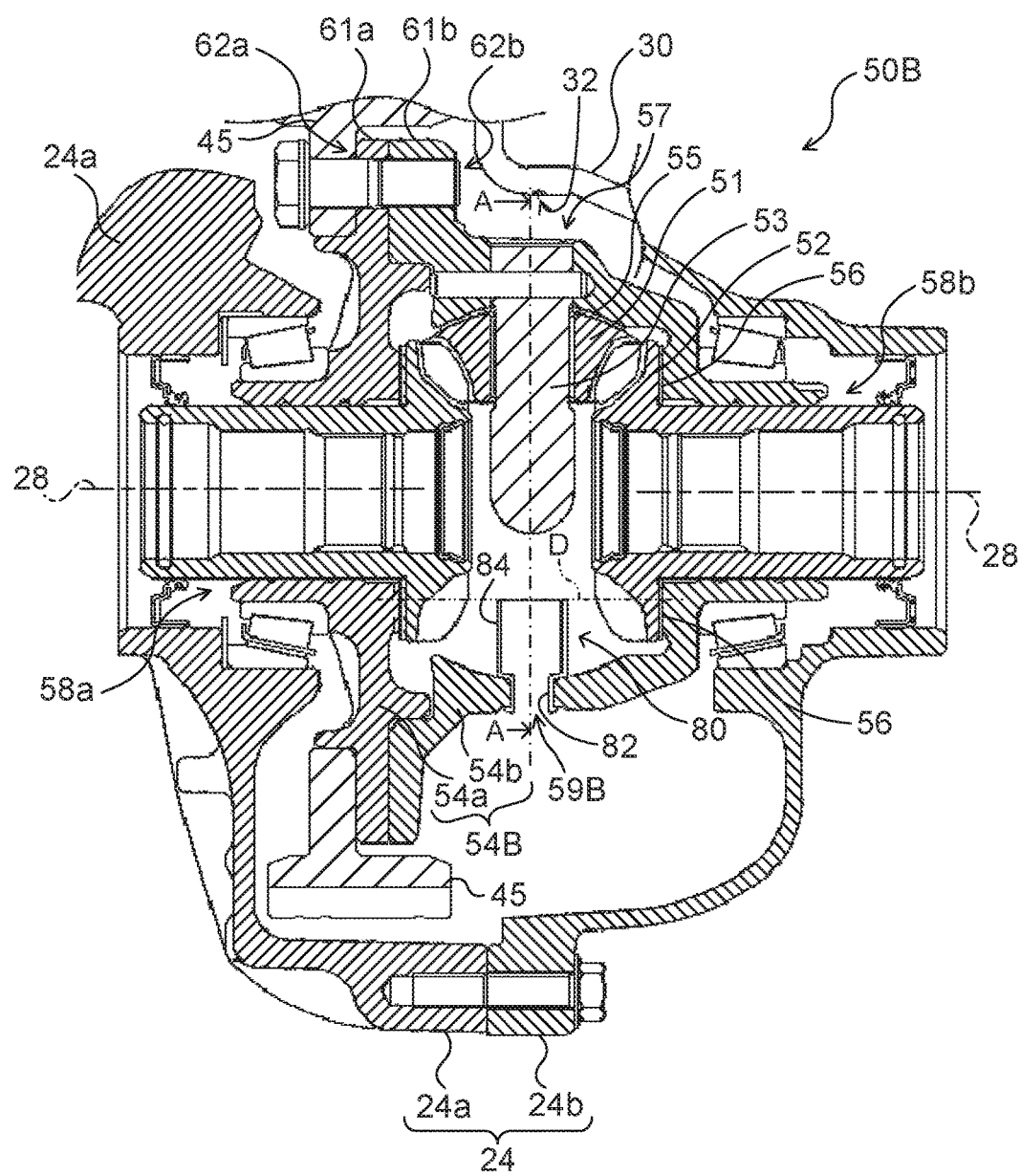
FIG. 6 is a diagram illustrating the structure of a differential apparatus 50B according to a second embodiment.
Figure 7:
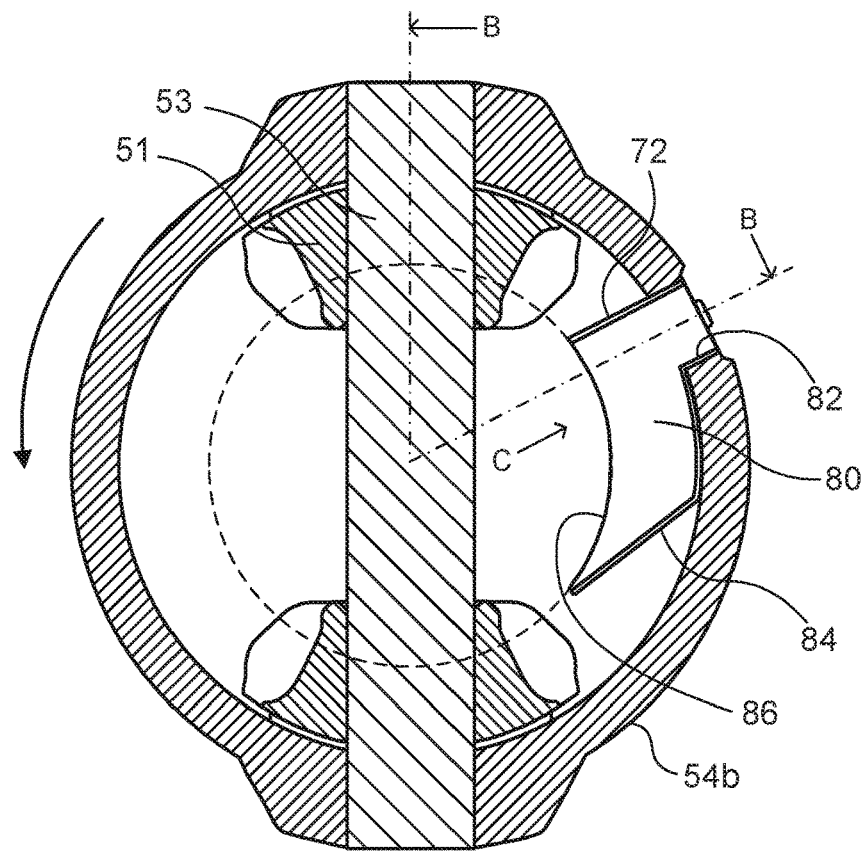
FIG. 7 is a simplified cross-sectional view illustrating an A-A cross-section in FIG. 6 in a simplified manner.

FIG. 6 is a schematic diagram illustrating the structure of a differential apparatus 50B, and FIG. 7 is a simplified cross-sectional view illustrating an A-A cross-section in FIG. 6 in a simplified manner. FIG. 6 illustrates a B-B cross-section in FIG. 7. An arrow in the left part of FIG. 7 indicates a direction in which the differential case 54B rotates during forward movement of a vehicle. As illustrated in FIG. 6, except for the pinion shaft hole 57 and the pair of drive shaft holes 58a and 58b, the differential case 54B has no hole other than an oil hole 59B used to supply and drain lubricating oil. Lubricating oil is supplied to the oil hole 59B from a supply hole 32 in the lubricating oil supply pipe 30.

Figure 8:
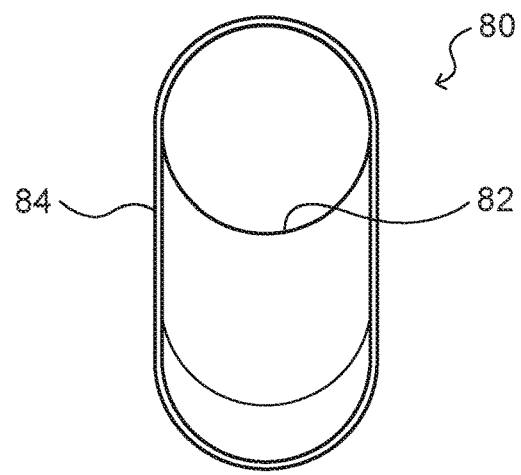
FIG. 8 is a plan view of a lubricating oil retaining member 80 from an arrow C in FIG. 7.

The lubricating oil retaining member 80 is attached to the oil hole 59B in the differential case 54B (exactly, the case member 54b) to retain lubricating oil in the differential case 54B. FIG. 8 is a plan view of the lubricating oil retaining member 80 from an arrow C in FIG. 7. As illustrated in FIG. 6 to FIG. 8, the lubricating oil retaining member 80 includes a cylindrical fittingly inserted portion 82 that is fittingly inserted into the oil hole 59B and a wall portion 84 that extends toward the inner side of the differential case 54B to surround the entire circumference of the oil hole 59B. The front part (the upper part in FIG. 7, the upper part in FIG. 8) of the wall portion 84, with respect to the direction in which the differential case 54B rotates during forward movement of a vehicle, extends continuously from the fittingly inserted portion 82 over half the circumference. The rear part (the lower part in FIG. 7, the lower part in FIG. 8) of the wall portion 84, with respect to the direction in which the differential case 54B rotates during forward movement of a vehicle, spreads rearward while being inclined rearward. Furthermore, as illustrated in FIG. 6, the wall portion 84 is located radially inward of the outer periphery of the side gear washers 56 and has a top portion 86 that is shaped in an arc of a circle with the center on the rotation center of the differential case 54B as indicated by a broken line in FIG. 7.

Figure 9A:
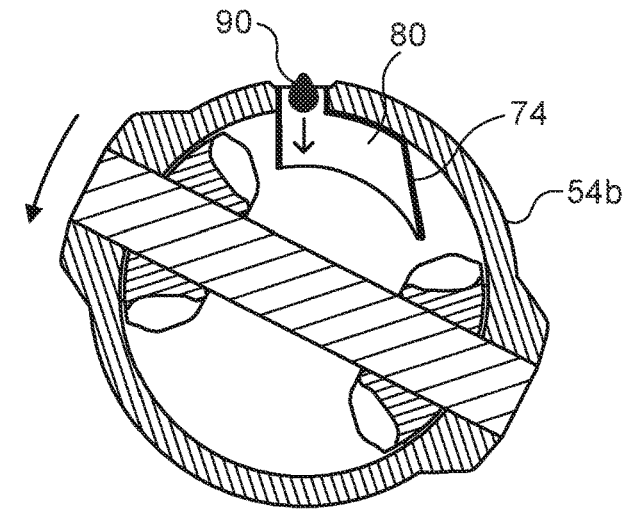
FIGS. 9A, 9B, and 9C are explanatory diagrams schematically illustrating how lubricating oil is supplied from an oil hole 59B into a differential case 54B when the differential case 54B is rotating.
Figure 9B:
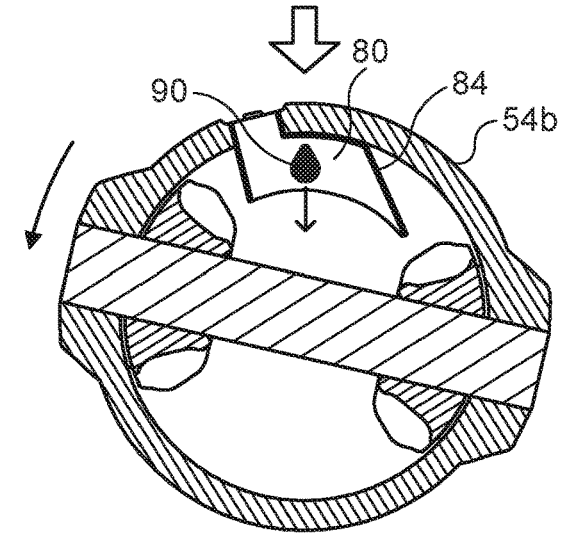
Figure 9C:
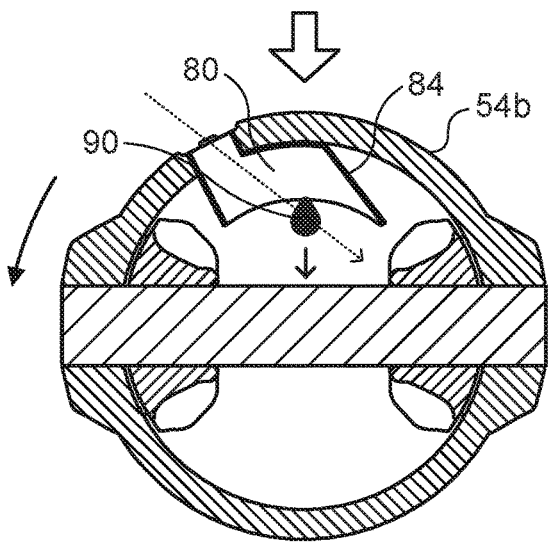

The reason the rear part of the wall portion 84 of the lubricating oil retaining member 80, with respect to the direction in which the differential case 54B rotates during forward movement of a vehicle, spreads rearward while being inclined rearward is to smoothly supply lubricating oil from the oil hole 59B into the differential case 54B. FIG. 9 illustrates how lubricating oil is supplied from the supply hole 32 in the lubricating oil supply pipe 30 into the differential case 54B through the oil hole 59B. FIGS. 9A to 9C show a time sequence of the rotational position of the differential case 54B and the position of an oil drop 90. An arrow in the left part of FIGS. 9A to 9C indicates the direction in which the differential case 54 rotates. A downward arrow illustrated below the oil drop 90 in FIGS. 9A to 9C indicates a direction in which the oil drop 90 drops. When the oil drop 90 is supplied to the oil hole 59B, and the differential case 54 starts rotating after a lapse of some time, the oil drop 90 (FIG. 9A) located in the middle of the fittingly inserted portion 82 of the lubricating oil retaining member 80 becomes located, with respect to the rotating direction, behind the oil hole 59 in a space surrounded by the wall portion 84 of the lubricating oil retaining member 80. A broken arrow in FIG. 9C indicates a relative direction in which the oil drop 90 drops (is supplied) with respect to rotation of the differential case 54B. Since the rear part of the wall portion 84 of the lubricating oil retaining member 80 spreads rearward while being inclined rearward as describe above, the oil drop 90 is supplied into the differential case 54B without hitting the wall portion 84. For ease of description, the description is based on the assumption that lubricating oil is supplied as the oil drop 90 from the supply hole 32 in the lubricating oil supply pipe 30 to the oil hole 59B, but the same is true for when lubricating oil is supplied continuously from the supply hole 32 in the lubricating oil supply pipe 30.

The reason the wall portion 84 of the lubricating oil retaining member 80 is located radially inward of the outer periphery of the side gear washers 56 and has the top portion 86 shaped in an arc of a circle is to allow the side gear washers 56 to be supplied with lubricating oil even when the differential case 54B stops. When the differential case 54B stops rotating, the level of lubricating oil in the differential case 54B depends on the position of the oil hole 59B and becomes lowest when the oil hole 59B is in the lowest position. In this case, as illustrated in FIG. 6, the level of lubricating oil is equal to the lowest part (a long dashed double-short dashed line D in FIG. 6) of the top portion 86 of the wall portion 84 of the lubricating oil retaining member 80. Since the lowest part of the top portion 86 of the wall portion 84 of the lubricating oil retaining member 80 is located above the outer periphery of the side gear washers 56 as illustrated in FIG. 6, the outer periphery side of the side gear washers 56 soaks in lubricating oil even when the level of lubricating oil is in the lowest position. When the oil hole 59B is not in the lowest position, the level of lubricating oil is in a higher position, so that the outer periphery side of the side gear washers 56 naturally soaks in lubricating oil. Thus, when the differential case 54B stops rotating, the side gear washers 56 are always suppliable with lubricating oil, regardless of the rotational position of the oil hole 59B. In contrast, when the differential case 54B is rotating, excessive lubricating oil is centrifugally drained from the oil hole 59B, but the outflow of lubricating oil is controlled by the wall portion 84 of the lubricating oil retaining member 80 that surrounds the oil hole 59B and that has the top portion 86 shaped in an arc of a circle. Thus, even when the differential case 54B is rotating, the outer periphery portion of the side gear washers 56 is suppliable with lubricating oil.

In the above-described differential apparatus 50B according to the second embodiment, except for the pinion shaft hole 57 and the pair of drive shaft holes 58a and 58b, the differential case 54B has no hole other than the oil hole 59B, and the lubricating oil retaining member 80 having the wall portion 84 extending straight to surround the oil hole 59B is attached to the oil hole 59B inside the differential case 54B. This allows lubricating oil to be retained in the differential case 54B. Further, since the top portion 86 of the wall portion 84 of the lubricating oil retaining member 80 is located radially inward of the outer periphery of the side gear washers 56, the side gear washers 56 can be supplied with lubricating oil, regardless of whether the differential case 54B is rotating or stops rotating. Furthermore, since the rear part of the wall portion 84 of the lubricating oil retaining member 80, with respect to the direction in which the differential case 54B rotates during forward movement of a vehicle, spreads rearward while being inclined rearward, lubricating oil can be smoothly supplied from the oil hole 59B into the differential case 54B.

In the differential apparatus 50B according to the second embodiment, except for the pinion shaft hole 57 and the pair of drive shaft holes 58a and 58b, the differential case 54B has no hole other than one oil hole 59B used to supply and drain lubricating oil. However, the number of oil holes is not limited to one and may be two or more. In this case, the lubricating oil retaining member 80 is attached to each oil hole.

In the differential apparatus 50B according to the second embodiment, the wall portion 84 of the lubricating oil retaining member 80 is shaped such that the top portion 86 is located radially inward of the outer periphery of the side gear washers 56. Alternatively, the top portion 86 may be located radially outward of the outer periphery of the side gear washers 56.

In the differential apparatus 50B according to the second embodiment, the rear part of the wall portion 84 of the lubricating oil retaining member 80, with respect to the direction in which the differential case 54B rotates during forward movement of a vehicle, spreads rearward while being inclined rearward. Alternatively, the rear part of the wall portion 84, with respect to the direction in which the differential case 54B rotates during forward movement of a vehicle, may spread rearward without being inclined rearward or may be inclined rearward without spreading rearward. The rear part of the wall portion 84, with respect to the direction in which the differential case 54B rotates during forward movement of a vehicle, may extend continuously straight from the fittingly inserted portion 82 as well as the front part.

In the differential apparatus 50B according to the second embodiment, the lubricating oil retaining member 80 includes the fittingly inserted portion 82 and the wall portion 84. Alternatively, a lubricating oil retaining member may include only a wall portion. In this alternative, the lubricating oil retaining member and the case member 54a of the differential case 54B may be either separate members or one member.

A differential apparatus (50) according to the present disclosure includes: a pinion gear (51) supported on a pinion shaft (53); a pair of side gears (52) meshing with the pinion gear (51) and respectively fixed to a pair of drive shafts (28); a differential case (54, 54a, 54b) that accommodates the pinion gear (51) and the pair of side gears (52) and that has a pinion shaft hole (57) through which the pinion shaft (53) is inserted and a pair of drive shaft holes (58a, 58b) through which the pair of drive shafts (28) are inserted; and side gear washers (56) located between the pair of side gears (52) and the differential case (54, 54a, 54b). Except for the pinion shaft hole (57) and the pair of drive shaft holes (58a, 58b), the differential case (54, 54a, 54b) has no hole other than at least one oil hole (59) that is located radially outward of the side gear washers (56) and that is used to supply and drain lubricating oil, and the differential apparatus further includes an oil outflow control member (70) that extends to a portion radially inward of an outer periphery of the side gear washers (56) to retain oil to a portion radially inward of the oil hole (59) in the differential case (54, 54a, 54b).

In the differential apparatus (50) according to the present disclosure, the pinion gear (51) and the pair of side gears (52) are accommodated in the differential case (54, 54a, 54b), and the side gear washers (56) are located between the side gears (52) and the differential case (54, 54a, 54b). Except for the pinion shaft hole (57) through which the pinion shaft (53) is inserted and the pair of drive shaft holes (58a, 58b) through which the pair of drive shafts (28) are inserted, the differential case (54, 54a, 54b) has no hole other than at least one oil hole (59) that is located radially outward of the side gear washers (56) and that is used to supply and drain lubricating oil. The differential apparatus (50) further includes the oil outflow control member (70) that extends to the portion radially inward of the outer periphery of the side gear washers (56) to retain oil to the portion radially inward of the oil hole (59) in the differential case (54, 54a, 54b). When the differential case (54, 54a, 54b) stops rotating with the oil hole (59) in the lowest position, oil is retained to the portion radially inward of the oil hole (59) in the differential case (54, 54a, 54b) by the oil outflow control member (70) that extends to the portion radially inward of the outer periphery of the side gear washers (56). Thus, the side gear washers (56) can be supplied with lubricating oil. When the differential case (54, 54a, 54b) is rotating, lubricating oil in the differential case (54, 54a, 54b) is centrifugally drained from the oil hole (59), but lubricating oil located radially outward of the inner periphery of the oil outflow control member (70) is retained in the differential case (54, 54a, 54b). Thus, the side gear washers (56) can be supplied with lubricating oil. Therefore, regardless of rotation of the differential case (54, 54a, 54b), the side gear washers (56) can be supplied with lubricating oil.

In the differential apparatus (50) according to the present disclosure, the oil hole (59) may be located radially outward of the side gear washer (56) for one of the pair of side gears (52) with respect to the rotation center of the rotation axis of the drive shaft (28) corresponding to the one of the pair of side gears (52), the oil outflow control member (70) may be an annular member having an inner periphery smaller than the outer periphery of the side gear washers (56) with respect to the rotation center of the rotation axis and having an outer periphery located beyond the outermost edge of the oil hole (59) with respect to the rotation center, and the oil outflow control member (70) may be attached to the differential case (54, 54a, 54b) on a side where the one of the pair of side gears (52) is located.

In the differential apparatus (50) according to the present disclosure, the oil outflow control member (70) may be attached such that the outer periphery side of the oil outflow control member (70) is in contact with the differential case (54, 54a, 54b), such that the inner periphery side of the oil outflow control member (70) is not in contact with the differential case (54, 54a, 54b), and such that the oil hole (59) is partially uncovered.

Furthermore, in the differential apparatus (50) according to the present disclosure, the oil outflow control member (70) may be stopped from coming off by a race (27) of a bearing (26) that freely rotatably supports the differential case (54, 54a, 54b). This eliminates the need to add a member to stop the oil outflow control member (70) from coming off. In this case, the outer periphery of the oil outflow control member (70) may have an end (72) that extends along the rotation axis of the drive shaft (28) fixed to the one of the pair of side gears (52) and that abuts against the race (27) to stop the oil outflow control member (70) from coming off.

In the differential apparatus (50B) according to the present disclosure, the oil hole (59B) and the pinion shaft (53) may be located on an identical circumference and be circumferentially misaligned from each other, and the oil outflow control member (70) may include a lubricating oil retaining member (80) defining a wall portion that is located all around the oil hole (59B) inside the differential case (54B, 54a, 54b) and that extends toward the inner side of the differential case (54B, 54a, 54b). Thus, the wall portion (84) of the lubricating oil retaining member (80) controls the outflow of lubricating oil in the differential case (54B, 54a, 54b) so that lubricating oil can be retained in the differential case (54B, 54a, 54b).

In the differential apparatus (50B) including the lubricating oil retaining member (80) according to an aspect of the present disclosure, the rear part of the wall portion (84) of the lubricating oil retaining member (80), with respect to the direction in which the differential case (54B, 54a, 54b) rotates during forward movement of a vehicle, may be spaced rearward from the oil hole (59B). This allows lubricating oil to enter inside smoothly without hitting the wall portion (84) when lubricating oil is supplied to the oil hole (59B) during forward movement of a vehicle.

Furthermore, in the differential apparatus (50B) including the lubricating oil retaining member (80) according to an aspect the present disclosure, the rear part of the wall portion (84) of the lubricating oil retaining member (80), with respect to the direction in which the differential case (54B, 54a, 54b) rotates during forward movement of a vehicle, may be inclined rearward. This allows lubricating oil to enter inside smoothly without hitting the wall portion (84) when lubricating oil is supplied to the oil hole (59B) during forward movement of a vehicle.

In the differential apparatus (50B) including the lubricating oil retaining member (80) according to an aspect of the present disclosure, the wall portion (84) of the lubricating oil retaining member (80) may be shaped such that the top portion (86) of the wall portion (84) is located radially inward of the outer periphery of the side gear washer (56). This allows lubricating oil to be supplied to the side gears (52) and the side gear washers (56) during forward movement of a vehicle.

In the differential apparatus (50B) including the lubricating oil retaining member (80) according to an aspect of the present disclosure, the top portion (86) of the wall portion (84) of the lubricating oil retaining member (80) may be shaped in an arc of a circle with the center on the rotation axis of the differential case (54B, 54a, 54b). This allows lubricating oil to be retained stably when the differential case (54B, 54a, 54b) is rotating.

Although the present disclosure has been described with reference to the above embodiments, the present disclosure is not limited to the embodiments, and various modifications are possible without departing from the spirit of the present disclosure.

INDUSTRIAL APPLICABILITY

The present disclosure is applicable to, for example, manufacturing industries of differential apparatuses.

The invention claimed is:

1. A differential apparatus comprising:
a pinion gear supported on a pinion shaft;
a pair of side gears meshing with the pinion gear and respectively fixed to a pair of drive shafts;
a differential case that accommodates the pinion gear and the pair of side gears and that has a pinion shaft hole through which the pinion shaft is inserted and a pair of drive shaft holes through which the pair of drive shafts are inserted; and
two side gear washers, one each is located between a corresponding one of the pair of side gears and the differential case, wherein
except for the pinion shaft hole and the pair of drive shaft holes, the differential case has no hole other than at least one oil hole that is located radially outward of the side gear washers and that is used to supply and drain lubricating oil, and
the differential apparatus further comprises an oil outflow control member that extends to a portion radially inward of an outer periphery of the side gear washers as viewed from an axial direction of the drive shafts to retain oil to a portion radially inward of the oil hole in the differential case.

2. The differential apparatus according to claim 1, wherein
the oil hole is located radially outward of one of the side gear washers for one of the pair of side gears with respect to a rotation center of a rotation axis of the drive shaft corresponding to the one of the pair of side gears, and
the oil outflow control member is an annular member having an inner periphery smaller than the outer periphery of the side gear washers with respect to the rotation center of the rotation axis and having an outer periphery located beyond an outermost edge of the oil hole with respect to the rotation center, the oil outflow control member attached to the differential case on a side where the one of the pair of side gears is located.

3. The differential apparatus according to claim 2, wherein
the oil outflow control member is attached such that an outer periphery side of the oil outflow control member is in contact with the differential case, such that an inner periphery side of the oil outflow control member is not in contact with the differential case, and such that the oil hole is partially uncovered.

4. The differential apparatus according to claim 2, wherein
the oil outflow control member is retained on the differential apparatus by a race of a bearing that freely rotatably supports the differential case.

5. The differential apparatus according to claim 3, wherein
the oil outflow control member is retained on the differential apparatus by a race of a bearing that freely rotatably supports the differential case.

6. The differential apparatus according to claim 4, wherein
the outer periphery of the oil outflow control member has an end that extends along the rotation axis of the drive shaft fixed to the one of the pair of side gears, the end abutting against the race.

7. The differential apparatus according to claim 5, wherein
the outer periphery of the oil outflow control member has an end that extends along the rotation axis of the drive shaft fixed to the one of the pair of side gears, the end abutting against the race.

8. The differential apparatus according to claim 1, wherein
the oil hole and the pinion shaft are located on an identical circumference and are circumferentially misaligned from each other, and
the oil outflow control member includes a lubricating oil retaining member defining a wall portion that is located all around the oil hole inside the differential case and that extends toward an inner side of the differential case.

9. The differential apparatus according to claim 8, wherein
a rear part of the wall portion of the lubricating oil retaining member, with respect to a direction in which the differential case rotates during forward movement of a vehicle, is spaced rearward from the oil hole.

10. The differential apparatus according to claim 8, wherein
a rear part of the wall portion of the lubricating oil retaining member, with respect to a direction in which the differential case rotates during forward movement of a vehicle, is inclined rearward.

11. The differential apparatus according to claim 9, wherein
the rear part of the wall portion of the lubricating oil retaining member, with respect to the direction in which the differential case rotates during the forward movement of the vehicle, is inclined rearward.

12. The differential apparatus according to claim 8, wherein
the wall portion of the lubricating oil retaining member is shaped such that a top portion of the wall portion is located radially inward of the outer periphery of the side gear washers.

13. The differential apparatus according to claim 9, wherein
the wall portion of the lubricating oil retaining member is shaped such that a top portion of the wall portion is located radially inward of the outer periphery of the side gear washers.

14. The differential apparatus according to claim 10, wherein
the wall portion of the lubricating oil retaining member is shaped such that a top portion of the wall portion is located radially inward of the outer periphery of the side gear washers.

15. The differential apparatus according to claim 11, wherein
the wall portion of the lubricating oil retaining member is shaped such that a top portion of the wall portion is located radially inward of the outer periphery of the side gear washers.

16. The differential apparatus according to claim 8, wherein
a top portion of the wall portion of the lubricating oil retaining member is shaped in an arc of a circle with a center on a rotation axis of the differential case.

17. The differential apparatus according to claim 9, wherein
a top portion of the wall portion of the lubricating oil retaining member is shaped in an arc of a circle with a center on a rotation axis of the differential case.

18. The differential apparatus according to claim 10, wherein
a top portion of the wall portion of the lubricating oil retaining member is shaped in an arc of a circle with a center on a rotation axis of the differential case.

19. The differential apparatus according to claim 12, wherein
the top portion of the wall portion of the lubricating oil retaining member is shaped in an arc of a circle with a center on a rotation axis of the differential case.

* * * * *